United States Patent [19]

Inoue

[11] Patent Number: 4,530,471
[45] Date of Patent: Jul. 23, 1985

[54] METHOD OF AND APPARATUS FOR DISPENSING WIRE FROM A WIRE STORAGE SPOOL

[75] Inventor: Kiyoshi Inoue, Tokyo, Japan

[73] Assignee: Inoue-Japax Research Incorporated, Yokohama, Japan

[21] Appl. No.: 353,945

[22] Filed: Mar. 2, 1982

[30] Foreign Application Priority Data

Mar. 5, 1981 [JP] Japan .................. 56-30554

[51] Int. Cl.³ .......................................... B65H 59/38
[52] U.S. Cl. ................................... 242/45; 242/54 R
[58] Field of Search ..................... 242/25 R, 45, 54 R, 242/78.7, 148

[56] References Cited

U.S. PATENT DOCUMENTS

| | | | |
|---|---|---|---|
| 2,844,773 | 7/1958 | Turner et al. | 242/45 X |
| 2,981,491 | 4/1961 | Eans, Jr. | 242/45 |
| 3,526,368 | 9/1970 | Sanders | 242/45 X |
| 3,559,906 | 2/1971 | Krafft | 242/45 X |
| 3,765,988 | 10/1973 | Schaffer et al. | 242/45 X |
| 4,052,019 | 10/1977 | Dickson, Jr. | 242/45 X |
| 4,120,462 | 10/1978 | Raasch et al. | 242/45 |
| 4,327,873 | 5/1982 | Juppet et al. | 242/45 |

FOREIGN PATENT DOCUMENTS

| | | |
|---|---|---|
| 653902 | 5/1951 | United Kingdom . |
| 770494 | 3/1957 | United Kingdom . |
| 876342 | 8/1961 | United Kingdom . |
| 880689 | 10/1961 | United Kingdom . |
| 999276 | 7/1965 | United Kingdom . |
| 1036452 | 7/1966 | United Kingdom . |
| 1238872 | 7/1971 | United Kingdom . |
| 1258627 | 12/1971 | United Kingdom . |
| 1268497 | 3/1972 | United Kingdom . |
| 2043715A | 10/1980 | United Kingdom . |

Primary Examiner—Stuart S. Levy
Assistant Examiner—David Werner
Attorney, Agent, or Firm—Karl F. Ross; Herbert Dubno

[57] ABSTRACT

A method of and apparatus for dispensing wire from a massive storage spool make use of a rotary support for holding the storage spool and in bearing contact therewith. The rotary support comprises a pair of rollers, one of which is rotationally driven by a motor to turn the spool whereby to permit the wire to be unwound therefrom. The unwound wire is subject to a traction force applied by a capstan and pinch roller driven to advance the wire between outlet guide rollers into a utilization zone, e.g. the cutting zone in a wire-cut EDM machine. A sensor is provided to detect a deviation of the tension of the wire between the outlet guides and the storage spool from a predetermined value. The output of the sensor is applied to a servo control circuit for the motor rotating the rotary support and the wire storage spool so as to maintain the tension of the wire constant. The storage spool rotary support, capstan and the outlet guides are carried on a wheeled carrier and are also enclosed within an electrical shield to prevent emission of electrical noise produced therein.

19 Claims, 3 Drawing Figures

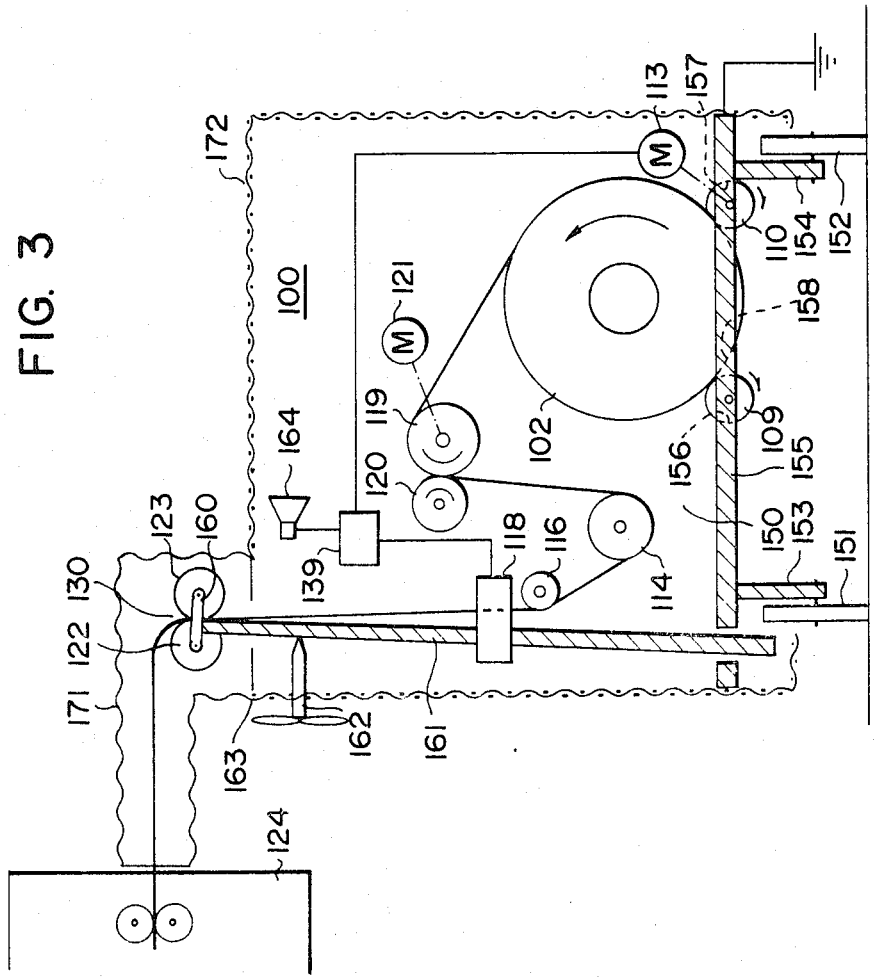

METHOD OF AND APPARATUS FOR DISPENSING WIRE FROM A WIRE STORAGE SPOOL

FIELD OF THE INVENTION

The present invention relates to a method of and to an apparatus for dispensing wire from a wire storage spool, especially but not exclusively for traveling-wire electro-erosion machines. The term "wire" is used throughout herein to refer to an elongated continuous metallic or any other element of a thin cross section and may include a tape.

BACKGROUND OF THE INVENTION

In a traveling-wire electroerosion (i.e. EDM or ECDM) machine, an electrically conductive wire composed of, say, copper or brass, serves as a cutting tool electrode. The continuous wire electrode is stretched between a pair of guide members defining a straight line path of wire travel in a cutting zone and is advanced axially to traverse a workpiece. An electrical machining current, typically in the form of a succession of electrical pulses, is passed between the traveling wire electrode and the workpiece to electroerosively remove material from the latter while relative displacement between the traveling wire electrode and the workpiece is effected along a prescribed path to form a cut of the corresponding contour in the workpiece.

The wire electrode is continuously renewed in the cutting zone by being continuously dispensed from a wire supply which is typically in the form of a wire storage spool having wire wound thereon. In dispensing the wire, a traction force is applied to the wire leading from the storage spool to unwind the wire therefrom. The traction force is typically produced by an intense capstan and pinch roller drive disposed downstream of the cutting zone to advance the wire therethrough. An intense braking capstan and pinch roller drive is also provided upstream of the cutting zone to make the traveling wire sufficiently taut between the cutting guide members. Because the wire must be as thin as 0.1 to 0.2 mm in diameter and must be composed of a material not to high in strength, there is a limitation in the tension which can be applied to the wire to maintain and increase its linearity.

Heretofore, a wire storage spool having wire wound thereon in weight up to 5 kg has been commonly in use. Such a spool is found to be inadequate where the workpiece is large and/or thick or the cutting path or trajectory is long enough to use up the wire on a single spool, and then a much more massive spool weighing, say, 30 kg is desirable. It has been found, however, that considerable difficulty is encountered in dispensing and feeding out wire as thin as 0.1 or 0.2 mm diameter from such a massive spool smoothly. It has been found that the conventional arrangement with an ordinary spool in which the spool is rotatably supported on a shaft retained in its axial opening and is allowed to rotate to unwind the wire can hardly be utilized with success. The wire being dispensed tends to slacken and jerk.

OBJECTS OF THE INVENTION

It is accordingly an object of the present invention to provide a novel and improved method of and apparatus for dispensing wire from a wire storage spool, especially a massive spool, whereby the wire can be unwound and fed out with an extreme smoothness and yet with a minimum unwinding resistance.

It is also an object of the invention to provide a wire dispensing method and apparatus of the type described which is especially suitable for use with a traveling-wire electro-erosion machine for a cutting operation which involves a large and/or thick workpiece or a long cutting path or trajectory.

SUMMARY OF THE INVENTION

These and other objects are attained, in accordance with the present invention, in a first aspect thereof, by a method of dispensing wire from a wire storage spool, which method comprises the steps of: supporting the wire storage spool rotatably about its axis on rotary support means in bearing contact therewith; spanning wire leading from the storage spool on a plurality of wire guides and through outlet guide means upstream of a wire utilization zone to form a continuous stretch of the wire between the storage spool and the utilization zone; rotationally driving the rotary support means to rotate the wire storage spool to allow the wire to be unwound therefrom; sensing the tension of the wire between the outlet guide means and the storage spool to detect a deviation thereof from a predetermined value; controlling the rate of rotation of the rotary support means so as to maintain the tension of the wire substantially at the predetermined value in spite of the changing amount of wire on the wire storage spool.

Specifically, the tension of the wire is maintained substantially constant at the predetermined value which ranges between 0.1 and 100 grams G. Stated otherwise, the difference in tension of the wire between the outlet guide means and the wire storage spool is maintained substantially constant at a value ranging between 0.1 and 100 grams G.

The utilization zone can advantageously be provided in a traveling-wire electroerosion machine. The method may include a further step of establishing the vertical position of the outlet guide means in relation to the machine.

Fraction may be applied to the wire at least in part by a capstan and pinch roller drive arranged in the machine to advance the wire from the outlet guide means into the utilization zone. Furthermore, the traction is applied to the wire at least in part by a capstan and pinch roller drive arranged between the wire storage spool and the outlet guide means and driven by a motor.

Specifically, the rotary support means may comprise a pair of parallel rotatable rollers supporting the wire storage spool and one of which is driven by a motor.

The method preferably includes a further step of electrically shielding the storage spool, the rollers, the capstan, the motors, the guides and the outlet guide means within a space on a carriage therefor to prevent emission of the electrical noise generated in the space.

The spool may have a pair of rims supported on the rotary support means in bearing contact therewith. Alternatively, the spool may be a rimless spool having a storage of the wire wound thereon and the wire on the spool is supported directly on the rotary support means in bearing contact therewith. The method may further comprise the step of providing an alarm signal representing a tendency towards exhaustion of the wire on the spool in response to the step of sensing the tension of the wire.

The invention also provides, in a second aspect thereof, an apparatus for dispensing wire from a wire storage spool, which apparatus comprises: rotary support means for supporting the wire storage spool rotatably thereon in bearing contact therewith; motor means for driving the rotary support means to rotate the wire storage spool whereby to allow the wire to be unwound therefrom; traction means for pulling the wire unwound from the storage spool to advance it through outlet guide means into a wire utilization zone in a machine, e.g. a traveling-wire electroerosion machine; sensing means for sensing the tension of the wire between the outlet guide means and the storage spool; and control means arranged responsive to the sensing means for acting on the motor means so as to maintain the tension of the wire substantially constant in spite of the changing amount of the wire on the storage spool.

Means may be provided for establishing the vertical position of the outlet guide means in relation to the machine. The traction means may comprise at least in part a capstan arranged between the wire storage spool and the outlet guide means and driven by motor means. Furthermore, the traction means may comprise at least in part a capstan arranged in the machine itself and driven to advance the wire through the outlet guide means into the utilization zone.

The apparatus preferably further comprises a movable, wheeled carrier to be disposed by the side of the machine and arranged to carry thereon the wire storage spool, the rotary support means, the motor means for the capstan and the outlet guide means. The outlet guide means is preferably supported on a post and provided with means for adjustably setting its vertical position in relation to the machine.

In the apparatus, preferably the wire storage spool, the rotary support means, the motor means for the rotary support means, the capstan and the motor means for the capstan are enclosed within an electrical shield to prevent emission of electrical noise generated therein. The outlet guide means preferably is also enclosed in the electrical shield, which may be a screen mesh of electrically conductive wire and is grounded.

Furthermore, the apparatus may include alarm means in response to the sensing means for signalling the approach of exhaustion of the wire on the storage spool.

BRIEF DESCRIPTION OF THE DRAWING

These and other features of the present invention as well as advantages thereof will become more readily apparent from the following description of certain preferred embodiments thereof made with reference to the accompanying drawing in which:

FIG. 3 is a sectional view of another form of the apparatus embodying the present invention.

SPECIFIC DESCRIPTION

Figure 1:
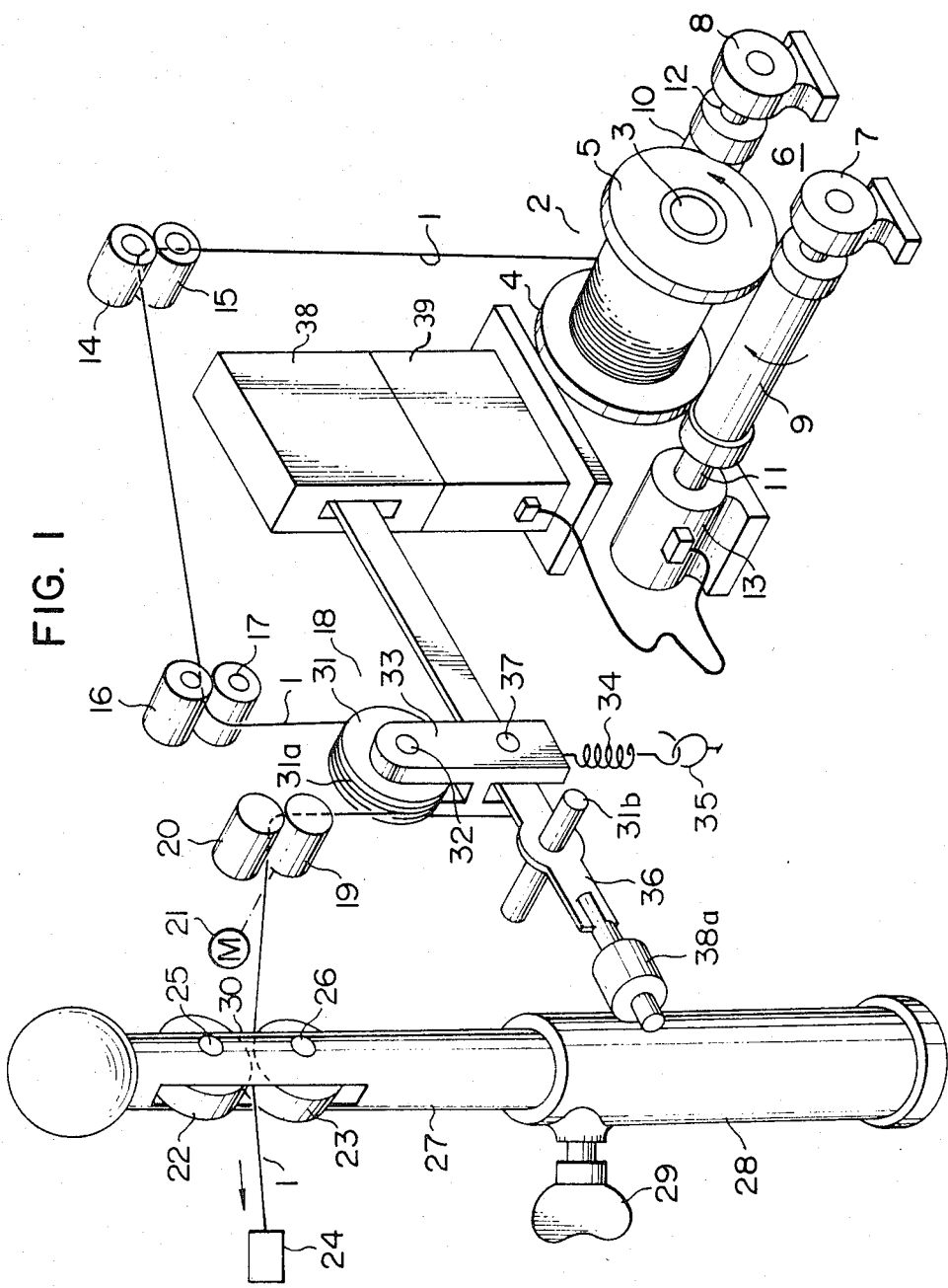
FIG. 1 is a perspective view diagrammatically illustrating an apparatus according to the invention.

Referring now to FIG. 1, a wire 1 is shown as being unwound from a spool 2 having an axial hole 3. The spool 2 stores wire 1 wound thereon in an amount of, say, 30 kg. The spool has a pair of rims 4 and 5 rotatably supported on a pedestal or bearing stand 6 which comprises a pair of plummer blocks 7 and 8. Each of the blocks 7, 8 comprises a roll 9, 10 composed of a frictional material such as rubber and a rotatable shaft 11, 12 which holds the roll 9, 10. One of the shaft, 11, is driven by a motor 13 via a gear transmission (not shown) to rotate the roll 9 and hence the spool 2 smoothly to allow the wire 1 to be unwound and dispensed therefrom. The wire 1 is then allowed to pass between guide rollers 14 and 15, between guide rollers 16 and 17, through a tension sensing assembly 18, between a capstan 19 and a pinch roller 20 and between guide rollers 22 and 23, and eventually into a utilization zone 24 of a machine not shown. If the machine is a traveling-wire electroerosion cutting machine, the wire 1 is then allowed to travel through several further pairs of guide rollers and thereafter a pair of cutting guides which define a straight cutting stretch extending across a workpiece.

The outlet guides 22 and 23 are rotatably held with parallel pins 25 and 26 on a supporting post 27 which is slidably received in a cylindrical stand 28. The post 27 is secured to the stand 28 with a butterfly screw 29 to establish a desired vertical position of the wire outlet 30 defined at the interface between the guide rollers 22 and 23.

The tension sensing assembly 18 includes a pulley 31 having its grooved rim 31a over part of which, as shown, the wire 1 is guided. The wire 1 is pulled therearound by the capstan 19 which is driven by a motor 21 and against which the pinch roller 20 is pressed. The pulley 31b is rotatably supported by a pin 32 secured to a supporting block 33 which is pulled downwards by a spring 34 hooked to a ring 35 secured in position. A lever 36, pivoted on a shaft 31 fixed in position, is connected to the block 33 with a connecting pin 37. The lever 36 is shown carrying at its one end a balancing weight 38a to modify the downward pulling force applied by the spring 34 to the block 33 and hence to the pulley 31 tending to pull upwards by the pulling wire 1 so as to hold the pulley 31 at a predetermined vertical position as long as the difference between the tension of th wire 1 on the side of the capstan 19 and the pinch roller 20 and the tension of the wire 1 being unwound from the storage spool 2 remains constant.

The capstan 19 is driven by the motor 21 at a constant rate of rotation to pull the wire 1 at a constant force and to feed it into the utilization zone 24 via the outlet guides 22 and 23 at a constant rate of advance. At the same time, the wire 1 is subject to the braking force of the unwinding spool 2. It is found that the torque of the rotating spool 2 varies with the changing amount of the wire 1 on the spool 2 and thus with the changing weight of the spool 2. The sensing assembly 18 accordingly senses the tension difference between the spool 2 and the capstan 19. Furthermore, a transducer 38 (FIG. 2) is provided to transform a detected tension difference into a corresponding electrical signal to act on a control circuit 39 (FIG. 2) for the servo motor 13.

Figure 2:
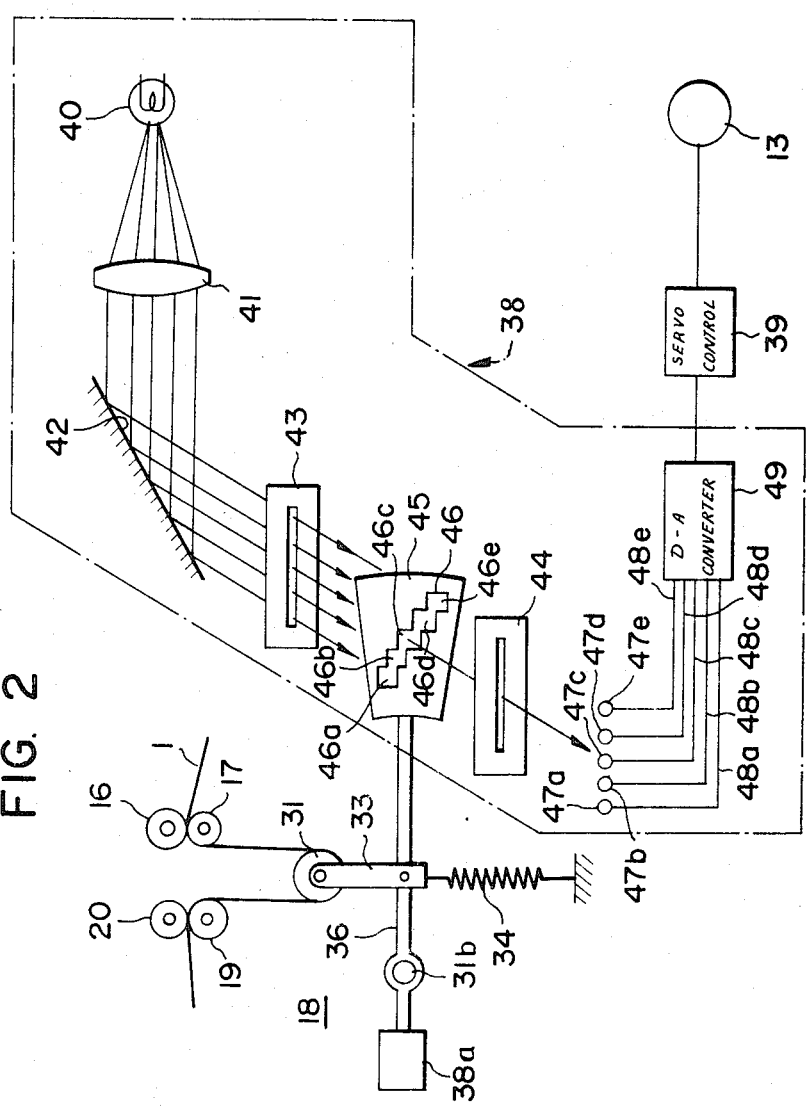
FIG. 2 is a diagrammatic illustration of the tension sensing assembly of FIG. 1 and a transducer assembly therefor.

A preferred example of the transducer 38 is shown in FIG. 2, together with the sensing assembly 18, the control circuit 39 and the servo motor 13. The transducer 38 shown includes a light source 40 emitting a light beam which is projected through a lens 41 and reflected on a mirror 42 for passage through a pair of guide slits 43 and 44 each extending horizontally and positioned in alignment with one another in the path of the light beam. A code plate 45 supported on the lever 36 at its end opposite to the end thereof carrying the weight 38a in the tension sensing assembly 18 is positioned between the guide slits 43 and 44. The code plate 45 is formed with a coding slit 46 comprising a plurality of stepped slit divisions 46a, 46b, 46c, 46d and 46e. Furthermore, a plurality of light-sensing elements 47a, 47b, 47c, 47d and 47e are positioned in a row in alignment with the guide slits 43 and 44 for reception of the light beam passing through these slit divisions in the plate 45, respectively. These elements 47a–47e, each of which is an opto-electrical transducer, are connected via respective electrical output terminals 48a–48e to a digital-to-analog (DA) converter 49 which in turn feeds into the control circuit 39 for the servo motor 13.

The weight 38a and the tension of the spring 34 are adjusted to balance the lever 36 in a horizontal plane when the tension of the wire 1 which acts against the gravitational forces on the pulley 31, block 33, lever 36, the code plate 45 and the weight 38a and the tension of the spring 34 as well as the torque or torsional forces on the lever 36 by the weight 38a and the spring 34 about the shaft or hinge 31b is a predetermined value. Thus, with the tension of the wire 1 increased above the predetermined value, the pulley 31 tends to be pulled upwards to turn the lever 36 counterclockwise. On the contrary, with the tension of the wire 1 reduced below the predetermined value, the pulley 31 tends to be pulled downwards to turn the lever 36 clockwise. The vertical position of the code plate 45 is varied accordingly, to change the light-sensing elements 47a–47e responsive to the light beam allowed to pass through the coding slit 46.

With the tension T of the wire 1 held at the predetermined value To, the element 47c is actuated. With the tension T increased in succession thereabove, the elements 47b and 47a become responsive to the light in turn. On the contrary, with the tension t reduced in succession thereunder, the elements 47d and 47e become responsive to the light in turn. The output signals of the elements 47 in a digital form are converted by the DA converter 49 into an analog signal which is applied to the servo-control circuit 39 for controlling the rate of rotation of the motor 13 operating to unwind the wire 1 from the storage spool 2 so as to maintain the tension of the wire 1 at the predetermined value To.

It is essential that the tension T of the wire 1, i.e. the difference of the tension of the wires on the side of the capstan 19 and the pinch roller 20 and on the side of the unwinding spool 2, be held at a predetermined value generally in the range between 0.1 and 100 grams G, thus at a value of, say, 50 grams G.

By virtue of the foregoing arrangement according to the invention, it is thus possible to dispense wire from a storage spool towards a utilization zone of a machine with a minimum unwinding resistance and yet with an extreme smoothness constantly in spite of the changing amount of the wire on the spool or the changing weight of the spool. No slackening or jerking of the unwinding wire will take place. Nor will any substantial slippage occur between the wire and the capstan thus allowing the rate of its drive and the rate of advance of the wire into the utilization zone to be precisely regulated.

In the foregoing explanation of the arrangement, it has been pointed out that the capstan 19 may be driven at a constant rate. It is possible and often desirable, however, to vary the rate of drive of the capstan 19 in the wire dispensing assembly of the invention in accordance with the change in the drive rate of a capstan to be arranged in a wire collection site downstream of the wire-utilization zone 24 or a wirebreaking capstan to be arranged between the outlet guides 22, 23 and the utilization 24 to stretch the wire traveling through the latter under a predetermined tension. Furthermore, the capstan 19 and the pinch roller 20 in the arrangement shown may be replaced simply with a pair of rotatable abutting guide rollers and their functions of pulling the wire 1 may be served by the braking capstan and pinch roller as mentioned.

While the apparatus shown in FIG. 1 may as a whole be mounted to a portion of the machine such as a column or head thereof, it is found to be desirable to carry it on a movable wheeled carriage, e.g. cart or wagon, for disposition by the side of the machine. In this manner, a large and heavy wire storage spool can conveniently be utilized. In constructing the arrangement to this end, rollers 9a and 10, guide rollers 14, 15; 16, 17; 22, 23 and capstan and pinch rollers, 19, 20 and the pulley 31 so on should be composed of an electrically nonconductive material. The apparatus should also be shielded to prevent emission of electrical noise generated by motors 13 and 21 etc. and to eliminate jamming or its interference with a current conduction through the utilization zone 24. The environment of outlet guide rollers 22 and 23 feeding out the wire 1 as well should be covered for safety and shielded electrostatically for noise arrestation and jamming prevention.

FIG. 3 shows an apparatus 100 of the invention carried on a movable carrier 150 equipped with at least a pair of wheels 151 and 152 which are rotatably secured to wheel supports 153 and 154, respectively, which depend from a floor plate 155. The wheels 151 and 152 are shown as movable on the ground. A pair of rollers 109 and 110 are rotatably secured to the plate 155 to carry a wire storage spool 102 and to rotate through openings 156 and 157 in the plate 155. The plate 155 is formed with a further opening 158 to allow the peripheral portion of the spool 102 to pass therethough. The roller 110 is driven by a motor 113 to rotate the spool 102 to allow wire 101 to be continuously unwound therefrom while the wire 101 is passed between a capstan 119 driven by a motor 121 and a pinch roller 120 pressed against the capstan. The wire 101 is continuously guided over guide rolls 114 and 116 and between outlet guide rollers 122 and 123 for advance into a traveling-wire EDM machine 124. The outlet guide rollers 122 and 123 are held together by a pair of holding elements 160, one of which is shown, and are supported by a rod 161. The latter is secured by a screw 162 against a wall 163 to establish the outlet guides 122 and 123 and hence the outlet 130 for the wire 101 at an appropriate vertical position.

The wire 101 traveling between the outlet 130 and the machine 124 is arranged to run within the space defined by the inner wall of a tubular shield 171 (e.g. of mesh screen) which extends to enclose the guide rollers 122 and 123 and to connect with a screen mesh of an electrically conductive metal 172 which encloses the apparatus 100 as shown to constitute an electrical shield for preventing emission of electrical noise generated by motors 113 and 121 etc. and eliminating its interference with electrical signals passed through electrical elements in the machine 124. The mesh screen 172 and the conductive plate 155 are electrically grounded to prevent development of an electrical voltage for electrical safety.

In the path of travel of the wire 101 between the guide roll 116 and the outlet guide rollers 122, 123 there is provided a tension sensing assembly 118 secured to the supporting rod for the guides 122 and 123. The assembly 118 may be of a form as described in connection with FIG. 2 or any other known form utilizing a displacement sensor with a strain gauge or a differential transformer or with a linear or rotary sliding resistor. Any other known displacement sensor utilizing a resonant frequency detector or capstan drive power sensor may alternatively be used. The output of the tension sensing assembly 118 is fed to a control circuit 139 which drives the motor 113. Here the circuit 139 again functions to control the rate of rotation of the motor 113 driving the roller 110 and in turn the rate of turning of the wire storage spool 102 rotationally driven thereby and also provides an alarm signal by actuating a speaker 164 when the wire 101 tends to be exhausted on the spool 102. The tendency of wire exhaustion can be ascertained by monitoring the tension on the wire.

What is claimed is:

1. A method of dispensing thin, electrically conductive wire from a massive wire storage spool to feed the wire as a continuous, traveling electrode into, and continuously transport it through, a cutting zone defined in a traveling-wire electroerosion machine, the method comprising the steps of:
   supporting the massive wire storage spool rotatably on rotary support means in a space adjacent the electroerosion machine;
   spanning the wire leading from said storage spool on a plurality of wire guides in said machine through outlet wire guide means disposed at an outlet side of said space and adjacent the machine to establish a continuous stretch of the wire between said storage spool in said space and said cutting zone in said machine;
   establishing the vertical position of said outlet guide means in relation with the electroerosion machine;
   rotationally driving said rotary support means by energizing electric motor means drivingly coupled therewith in said space to rotate said storage spool while applying a traction drive to said continuous stretch at least in part by means of a capstan arranged in said machine to allow the electrode wire on said spool to be unwound therefrom and to be advanced via said outlet guide means into and through said cutting zone;
   controlledly energizing said electric motor means rotating said rotary support means so as to maintain the tension of the advancing wire between said outlet wire guide means and said storage spool substantially constant; and
   electrically shielding said space to prevent or reduce emission of electrical noise generated therein.

2. The method defined in claim 1 wherein said rotary support means comprises a pair of parallel rotatable rollers supporting said wire storage spool and at least one of which is driven by said motor means.

3. The method defined in claim 2 wherein said spool has a pair of rims supported on said parallel rotatable rollers in frictional bearing contact therewith.

4. The method defined in claim 2 wherein said spool is a rimless spool having a storage of the wire wound thereon and the wire on said spool is supported directly on said parallel rotatable rollers in frictional bearing contact therewith.

5. the method defined in claim 2 wherein said traction is applied to said wire in part by means of a capstan arranged in said space between said wire storage spool and said outlet guide means and driven by a motor disposed in said space.

6. The method defined in claim 1 or claim 5 wherein said tension of the wire is maintained substantially constant at a predetermined value ranging between 0.1 and 100 grams G.

7. The method defined in claim 1 or claim 5 wherein said motor means is controlledly energized by sensing the tension of the wire advancing between said storage spool and said outlet guide means to produce an electric signal representing a change in said tension and controlling said motor means in response to said electric signal.

8. The method defined in claim 7, further comprising the steps of monitoring said electric signal and producing an alarm signal representing a tendency of exhaustion of the wire on said spool.

9. In combination with a traveling-wire electroerosion machine having a cutting zone defined between wire guide members for erosively cutting an electrically conductive workpiece with a thin, continuous electrode wire axially traveling continuously therethrough, an apparatus for dispensing the wire from a massive wire storage spool into the cutting zone, the apparatus comprising:
   rotary support means disposed in a space adjacent said machine for supporting said wire storage spool rotatably thereon in frictional bearing contact therewith;
   electric motor means disposed in said space for rotationally driving said rotary support means to rotate said storage spool whereby to allow the wire to be unwound therefrom;
   traction means including capstan means in said machine for pulling the wire unwound from said storage spool to advance it through outlet guide means disposed at an outlet side to said space into said cutting zone;
   means for adjustably establishing the vertical position of said outlet guide means;
   sensing means disposed in said space for sensing the tension of a continuous stretch of the wire advancing from said storage spool into said cutting zone to produce an electric signal representing a change in said tension;
   control means disposed in said space and responsive to said electric signal for controlledly driving said electric motor means rotating said rotary support means so as to maintain said tension of the wire substantially constant; and
   electrical shield means enclosing said space for preventing or reducing emission of electrical noise generated therein.

10. The apparatus defined in claim 9 wherein said electrical shield means comprises a screen mesh of electrically conductive material which is grounded.

11. The apparatus defined in claim 9 wherein said rotary support means comprises a pair of rotatable rollers at least one of which is rotationally driven by said motor means.

12. The apparatus defined in claim 11 wherein said rollers are composed of electrically insulating, frictional material.

13. The apparatus defined in claim 11 wherein said spool has a pair of rims supported on said rollers in frictional bearing contact therewith.

14. The apparatus defined in claim 11 wherein said spool is a rimless spool having a storage of the wire wound thereon for frictional bearing contact with said rollers.

15. The apparatus defined in claim 9 wherein said traction means includes a capstan arranged in said space between said wire storage spool and said outlet guide means.

16. The apparatus defined in claim 9, further comprising wheeled carrier movable to be disposed adjacent the electroerosion machine and arranged to carry all means in said space, including said wire storage spool, said rotary support means and said motor means and enclosed with said electrical shield means.

17. The apparatus defined in claim 16 wherein said outlet guide means is also enclosed with said electrical shield means and carried on said movable wheeled carrier.

18. The apparatus defined in claim 17 wherein said outlet guide means is supported on a post carried on said carrier and provided with said means for adjustably establishing the vertical position.

19. The apparatus defined in claim 9, further comprising alarm means responsive to said sensing means for alerting a tendency of exhaustion of said wire on said storage spool.

* * * * *